(12) United States Patent
Liebart

(10) Patent No.: US 8,878,530 B2
(45) Date of Patent: Nov. 4, 2014

(54) MEASUREMENT METHOD AND MAGNETIC SENSOR FOR THE CONTACTLESS DETECTION OF MOVEMENTS

(75) Inventor: Vincent Liebart, Lyons (FR)

(73) Assignee: Electricfil Automotive, Miribel Cedex (FR)

( * ) Notice: Subject to any disclaimer, the term of this patent is extended or adjusted under 35 U.S.C. 154(b) by 228 days.

(21) Appl. No.: 13/512,058

(22) PCT Filed: Nov. 26, 2010

(86) PCT No.: PCT/FR2010/052549
§ 371 (c)(1),
(2), (4) Date: Jun. 4, 2012

(87) PCT Pub. No.: WO2011/077022
PCT Pub. Date: Jun. 30, 2011

(65) Prior Publication Data
US 2012/0242332 A1    Sep. 27, 2012

(30) Foreign Application Priority Data

Nov. 27, 2009  (FR) ...................................... 09 58431

(51) Int. Cl.
*G01R 33/06* (2006.01)
*G01D 5/14* (2006.01)
*G01D 3/028* (2006.01)

(52) U.S. Cl.
CPC ............... *G01D 3/028* (2013.01); *G01D 5/145* (2013.01)
USPC ...... 324/251; 324/252; 324/253; 324/207.23; 324/207.24; 324/207.25

(58) Field of Classification Search
USPC ............................ 324/207.2, 207.21, 207.11, 324/207.23–207.25
See application file for complete search history.

(56) References Cited

U.S. PATENT DOCUMENTS

| 4,361,805 | A | 11/1982 | Narimatsu et al. | |
| 6,577,120 | B2* | 6/2003 | Oomkes | 324/207.2 |
| 6,777,928 | B2* | 8/2004 | Ramirez | 324/207.25 |

FOREIGN PATENT DOCUMENTS

| FR | 2197213 | 3/1974 | |
| WO | WO 89/10540 | * 11/1989 | ............... G01D 5/14 |

* cited by examiner

Primary Examiner — Arleen M Vazquez
Assistant Examiner — Alesa Allgood
(74) Attorney, Agent, or Firm — Ladas & Parry LLP

(57) ABSTRACT

A measuring method of contactless magnetic detection of relative movement along a trajectory between a main creation system and a measuring system sensitive to the direction of the magnetic field, the creation system creating a main magnetic field of direction that varies in a plane detected by the measuring system to determine the relative position along that trajectory. The method includes subjecting the measuring system to a compensation magnetic field of direction that is fixed and opposite to the direction of the maximum main magnetic field measured by the measuring system and delivered uniquely by the main creation system and in determining the direction of a magnetic field resulting from the combination of the main magnetic field and the compensation magnetic field by measuring the two mutually-orthogonal components of the resultant magnetic field respectively varying substantially as cosine and sine functions of the angle of the resultant magnetic field.

8 Claims, 2 Drawing Sheets

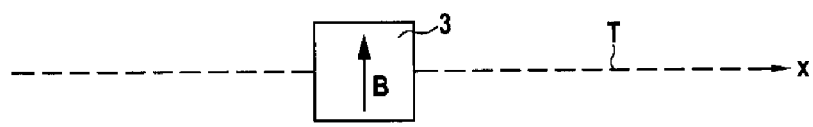
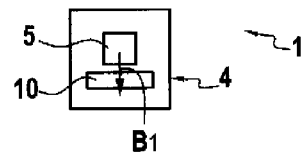
FIG.1
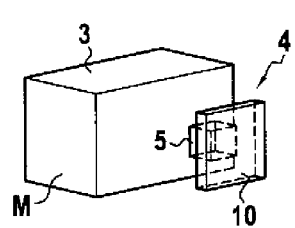 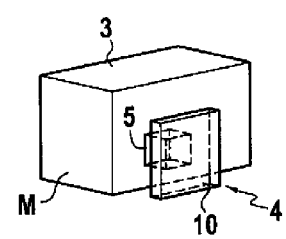 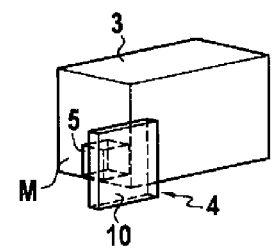
FIG.2A  FIG.2B  FIG.2C
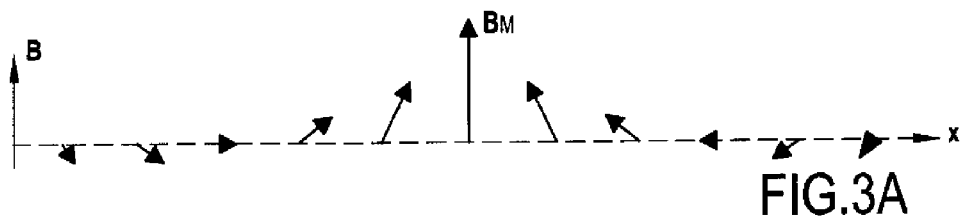
FIG.3A
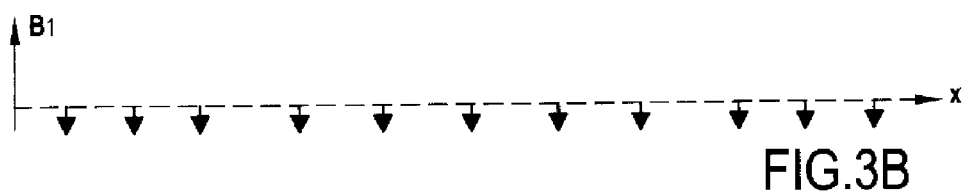
FIG.3B
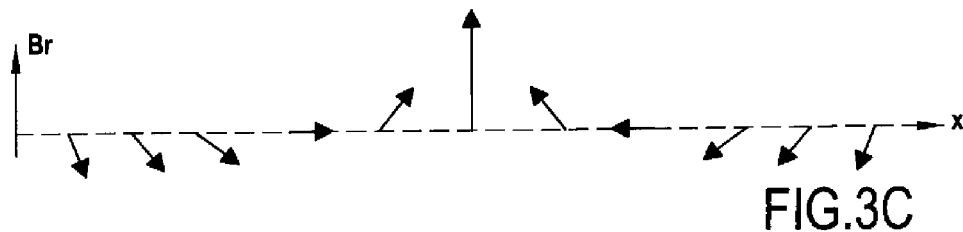
FIG.3C

MEASUREMENT METHOD AND MAGNETIC SENSOR FOR THE CONTACTLESS DETECTION OF MOVEMENTS

This application is a 371 of PCT/FR2010/052549, filed on Nov. 26, 2010, which claims priority to French patent application number 0958431, filed Nov. 27, 2009, which is incorporated herein by reference.

The present invention relates to the technical field of contactless magnetic sensors adapted to identify the position of a movable body along a particular linear trajectory and/or in rotation.

The invention finds a particularly advantageous, but non-exclusive, application in the field of motor vehicles to equip various members of limited linear and/or rotary movement, and of position that needs to be known.

For example, the invention finds preferred applications in the field of position sensors for the gearbox or the braking system of a motor vehicle.

In the prior art there exist numerous types of contactless sensor adapted to determine the linear position of a body moving in translation, for example. Thus, sensors of the optical type are known, with the major drawback thereof being manufacturing cost. By virtue of its design, a wound eddy current sensor has large overall size, thereby limiting its applications.

Also known are magnetic sensors such as the sensor described in Patent EP 0 979 988, for example. That contactless magnetic sensor includes a measurement system placed in the vicinity of a movable magnet of position that is to be detected. That measuring system delivers an electrical signal relating to the direction of the magnetic field. The magnet is magnetized parallel to the stroke of the movable part for a linear movement and tangentially for a rotary movement.

The measuring system of such a sensor conventionally has upper and lower thresholds for detecting the amplitude of the field of direction that is to be detected. Although complying with the upper threshold generally does not cause any problem, complying with the lower detection threshold imposes the use of a bulky and relatively long magnet of length that approximately corresponds to substantially half of the stroke that is to be detected. The use of a more sensitive measuring system, i.e. one in which the lower detection threshold is lower, is not a solution that can be envisaged because the external field then interferes commensurately with the signal to be detected.

There is also known from Document WO 89/10540 a contactless magnetic sensor including a measuring system placed in the vicinity of first and second magnets arranged side by side and mounted to be movable with linear movement, and of position that is to be detected. The measuring system is associated with a third magnet centered relative to the first and second magnets. The measuring system delivers a measurement signal proportional to the amplitude of the resultant magnetic field of the three magnets. The major drawback of such a sensor is that it outputs a non-monotonic electrical signal during movement. To any one output electrical signal there correspond two possible mechanical positions. The theory of that sensor is therefore limited to detecting distance from the center of the stroke and not to determining the absolute position of the system of magnets. Moreover, apart from direct capture of the amplitude of the magnetic field, the output signal is sensitive to variations in air gap and in temperature. Finally, the system of magnets is bulky, being longer than the stroke to be detected.

Document FR 2 452 716 describes a movement measuring system using magneto-resistive technology, that is sensitive to the direction of the magnetic field but that is unable to deliver a signal relating directly to that direction. That is why the sensor described in the above document is constituted of an assembly of magneto-resistive elements not having the function of capturing the direction of the field at a point in space. Thus the measurement sensor proves to be larger than the stroke to be detected.

In a similar way, Document FR 2 197 213 describes a variable resistance measuring device including two variable resistance systems placed in the vicinity of a movable generator that produces a control field. When the generator is moved, the resistance of the systems varies, enabling the relative position of the movable generator to be determined. The major drawback of that measuring device relates to the overall size of the measuring system, made up of magnets and ferromagnetic parts, relative to the output signal that can be processed.

The invention thus aims to remedy the drawbacks of the prior art by proposing a contactless method of detecting movement that avoids problems linked to air gap variation and that can adapt to measuring system detection threshold constraints, whilst significantly reducing the overall size and in particular the volume of the magnet.

To achieve this objective, the invention provides a measuring method of contactless magnetic detection of relative movement along a trajectory between a creation system for creating a main magnetic field and a measuring system sensitive to the direction of the magnetic field, the creation system creating a main magnetic field of direction that is variable at least in a plane and that is detected by the measuring system in order to determine the relative position along that trajectory.

According to the invention, the measuring method consists in subjecting the measuring system to a compensation magnetic field of direction that is fixed and opposite to the direction of the maximum main magnetic field measured by the measuring system and delivered uniquely by the creation system, the method consisting in determining the direction of a magnetic field resulting from the combination of the main magnetic field and the compensation magnetic field by measuring the two mutually-orthogonal components of the resultant magnetic field varying respectively substantially as cosine and sine functions of the angle of the resultant magnetic field.

The method of the invention may include in combination at least one or more of the following additional features:
  subjecting the measuring system to the compensation magnetic field of amplitude that has a fixed value that, combined with the minimum amplitude measured by the measuring system and delivered uniquely by the creation system, yields an amplitude value above the lower detection threshold of the measuring system; and
  the direction of the main magnetic field varies over a range substantially of the order of 360°.

Another object of the invention is to propose a measurement magnetic sensor for contactless magnetic detection of relative movement along a trajectory between a main creation system for creating a main magnetic field and a measuring system sensitive to the direction of the magnetic field, the creation system creating a main magnetic field of direction that varies at least in a plane and that is detected by the measuring system in order to determine the relative position along that trajectory.

According to the invention, the magnetic sensor includes a compensation creation system for creating a compensation magnetic field associated with the measuring system for subjecting said measuring system to a compensation magnetic field of direction that is fixed and opposite to the direction of the maximum main magnetic field measured by the measuring system and delivered uniquely by the main creation system, the measuring system measuring the magnetic field resulting from the combination of the main magnetic field and the compensation magnetic field by measuring the two mutually-orthogonal components of the resultant magnetic field respectively varying substantially as cosine and sine functions of the angle of the resultant magnetic field.

The invention may include in combination at least one or more of the following additional features:

the compensation system for creating a compensation magnetic field delivers a compensation magnetic field of amplitude that has a fixed value that, combined with the minimum amplitude measured by the measuring system and delivered by the main creation system, yields an amplitude value greater than the lower detection threshold of the measuring system;

the compensation magnetic field created by said compensation creation system has a direction normal to the trajectory;

the compensation magnetic field created by said compensation creation system has a direction normal to the trajectory that is linear or circular; and the system for creating a main magnetic field and the system for creating a compensation magnetic field are provided by magnets.

Various other features emerge from the description given below with reference to the appended drawings that show embodiments of the invention by way of non-limiting example.

FIG. 1 is a diagrammatic view of one embodiment of a magnetic sensor of the invention with magnetization normal to a linear trajectory T.

FIGS. 2A to 2C show various positions of the sensor shown in FIG. 1 along the linear trajectory T.

FIG. 3A is a graph showing the variations in the direction of the main magnetic field B of the sensor shown in FIG. 1 as a function of the movement x along the trajectory T.

FIG. 3B is a graph showing the variations in the direction of the compensation magnetic field B1 of the sensor shown in FIG. 1 as a function of the movement x along the trajectory T.

FIG. 3C is a graph showing the direction of the resultant magnetic field Br combining the main magnetic field B and the compensation magnetic field B1 as a function of the movement x along the trajectory T.

As emerges more particularly from FIG. 1, the invention relates to a magnetic sensor 1 adapted to determine relative movement between a main creation system 3 for creating a magnetic field B and a measuring system 4 sensitive to the direction of the magnetic field. In the example shown, the measuring system 4 is fixed and the system 3 for creating the magnetic field B is movable along a trajectory T. In this embodiment, the system 3 for creating a magnetic field B is assembled with the movable body M of position that is to be determined, as shown in FIGS. 2A to 2C. Of course, the inverse arrangement may be used wherein the system 3 for creating a magnetic field B is fixed and the measuring system 4 is connected to the movable body M of position that is to be detected.

In the example shown in FIG. 1, the trajectory T is linear. As emerges from FIGS. 2A to 2C, the movable body M equipped with the creation system 3 is thus able to occupy all positions between its two end of stroke positions shown in FIGS. 2A and 2C, FIG. 2B showing the movable body M in its middle or half-stroke position. The creation system 3 creates a first or main magnetic field B of direction that varies in at least one plane, namely the plane of the page in the example shown and as is clearly apparent in FIG. 3A. In this example, the magnetization is considered as normal to the trajectory T since the main magnetic field B has a maximum amplitude BM when the direction of the main magnetic field B is perpendicular to the trajectory T.

It must be noted that in the example shown, the direction of the magnetic field B varies over a range substantially of the order of 360° along the trajectory T.

The creation system 3 is preferably provided by a so-called main magnet, which in the example shown in FIG. 1 has a magnetization direction or a magnetic axis that is perpendicular to the trajectory T.

According to the invention, the measurement magnetic sensor 1 includes a compensation creation system 10 for creating a second or compensation magnetic field B1 to subject the measuring system 4 to a compensation magnetic field B1 of direction that is fixed and opposite to the direction of the maximum magnetic field BM measured by the measuring system and delivered uniquely by the creation system 3. In the example shown and as emerges from FIG. 3B, the system 10 for creating a compensation magnetic field B1 thus delivers a compensation magnetic field B1 of direction that is normal to the trajectory T and opposite to the direction of the maximum main magnetic field BM measured by the measuring system 4. The system 10 for creating the compensation magnetic field B1 is advantageously provided by a so-called compensation magnet assembled or fixed to the measuring system 4 but not forming part of the measuring system 4 as such.

Figure 4:
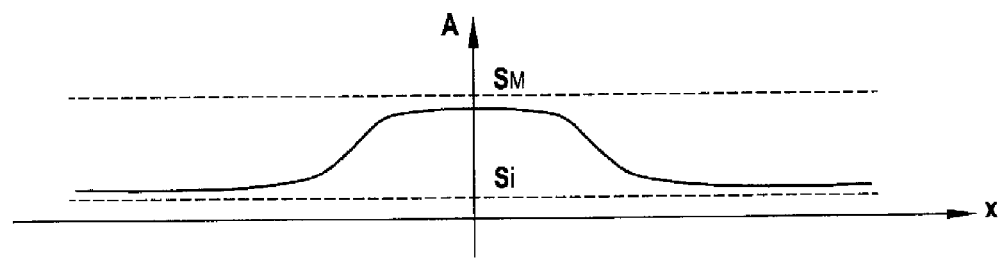
FIG. 4 is a graph showing the amplitude A of the resultant magnetic field Br of the sensor shown in FIG. 1 as a function of the movement x along the trajectory T.

It must be noted that the measuring system 4 measures, at a point in space, the direction of the resultant magnetic field Br corresponding to the combination of the first or main magnetic field B and the second or compensation magnetic field B1. The variations in the direction of the resultant magnetic field Br seen by the measuring system 4 are shown in FIG. 3C while FIG. 4 shows the amplitude A of the resultant magnetic field Br as a function of the movement x along the trajectory T. This FIG. 4 shows the upper detection threshold SM and the lower detection threshold Si of the measuring system 4.

The measuring system 4 is sensitive to the variation in the direction of the resultant magnetic field Br at a point in space, considering as a point measurement any measurement of a magnitude over a distance very much less than the distances characteristic of the system, for example the mechanical stroke under study. To detect the variation in the direction of the resultant magnetic field Br, Hall-effect or magneto-resistive technologies may advantageously be used to capture two mutually orthogonal components of the magnetic field at a point in space and one of which varies as the sine of the angle of the resultant magnetic field Br and the other as the cosine of that angle. The angle measurement may then be deduced from the measurements of these two components by calculating the arc tangent function of the ratio between the two measured magnitudes. The operation of determining the ratio of the two components sensitive in equivalent manner to the amplitude of the field renders the output of the measuring system insensitive to that amplitude. In any event, whatever operation the detection element uses to determine the direction of the magnetic field, whether it is a matter of processing magnitudes sensitive to the amplitude of that field or of using a technology directly sensitive to the direction of the magnetic field, the output of the measuring system is not sensitive to the amplitude of the field. In the example shown, the measuring system 4 includes at least one detection element 5 sensitive to the direction of the magnetic field. Such a detection element 5 may be produced by combining two Hall-effect or magneto-resistive assemblies sensitive to the amplitude of the field into mutually-orthogonal directions, for example, connected to means for processing the output signals delivered by the detection element 5 to calculate the ratio of these two components and the arc tangent function of the result obtained.

In known manner, the measuring system 4 including at least one detection element connected to processing means delivers in this way a signal proportional to the direction of the magnetic field measured at the point of movement of the measuring system 4 relative to the creation system 3. This direction being continuous and monotonic, the measuring system 4 is thus able to determine the position of the movable body on its trajectory as a function of the resultant magnetic field Br.

It must be considered that the compensation magnet does not modify the direction of the resultant magnetic field Br measured by the measuring system 4 when the main magnetic 3 is close to the measuring system 4 (the middle of the stroke of the movable body M). To the contrary, in this position, this compensation magnet 10 lowers the amplitude A of the field Br measured by the measuring system 4 since the maximum field BM is reduced by the value of the compensation field B1. When the main magnet 3 moves away from the measuring system 4, the main magnet 3 loses its influence on the resultant magnetic field Br measured by the measuring system 4. The compensation magnet 10 takes over from the main magnet 3, imposing the direction and amplitude of the resultant field Br measured by the measuring system 4. At the end of stroke, the measured resultant magnetic field Br remains above the lower detection threshold Si of the measuring system 4. In other words, the amplitude of the compensation magnetic field B1 has a fixed value such that in combination with the minimum amplitude of the main magnetic field B measured by the measuring system 4 the resultant magnetic field Br has an amplitude value above the lower detection threshold Si.

Adding a system 10 for creating a compensation magnetic field B1 facilitates adaptation to the constraint of the lower and upper thresholds of the measuring system 4 for the amplitude A of the resultant magnetic field Br of direction that is to be detected. Thus the invention enables retention of the standard detection threshold values, typically equal to 70 milli teslas (mT) and 20 mT, so that the external magnetic field does not interfere with the signal to be detected.

Moreover, this invention enables the volume of the main magnet 3 to be reduced by a factor of approximately two compared to a sensor including no compensation magnet 10.

The trajectory T of the movable body of position that is to be detected is advantageously symmetrical relative to the central position of the main magnet 3 corresponding to the position in which that main magnet imposes on the measuring system the magnetic field of maximum value. In this configuration, the rotation of the magnetic field varies over almost 180° on either side of the central position (half-stroke of the movable body).

Of course, the directions of the magnetic field delivered by the main magnet 3 and the compensation magnet 10 may be interchanged.

Figure 5:
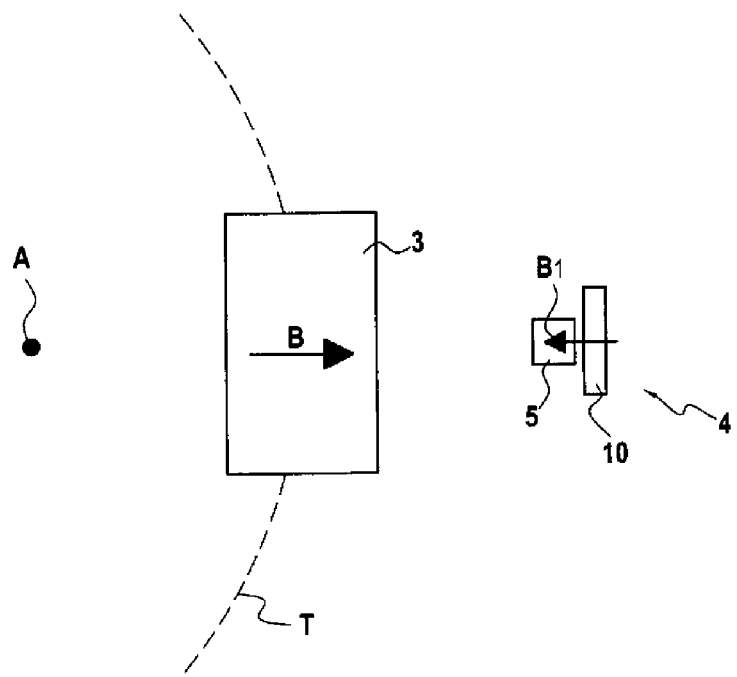
FIG. 5 shows a magnetic sensor of the invention with magnetization normal to a rotation trajectory.

In the above examples, the magnetization direction is normal to a linear trajectory T. The principle of the invention may of course be applied to detecting movement along a rotary trajectory. FIG. 5 shows a magnetic sensor 1 the movable body M of which has a rotation trajectory T about an axis A with magnetization normal to the trajectory T.

The invention is not limited to the examples described and shown as diverse modifications may be made to them without departing from the scope of the invention.

The invention claimed is:

1. A measuring method of contactless magnetic detection of relative movement along a trajectory between a main creation system for creating a main magnetic field and a measuring system sensitive to the direction of the magnetic field, the creation system creating a main magnetic field of direction that is variable at least in a plane and that is detected by the measuring system in order to determine the relative position along that trajectory, characterized in that it consists in subjecting the measuring system to a compensation magnetic field of direction that is fixed and opposite to the direction of the maximum main magnetic field measured by the measuring system and delivered uniquely by the main creation system, such that the measuring system is sensitive to a resultant magnetic field resulting from the combination of the main magnetic field and the compensation magnetic field, the direction of the resultant magnetic field being variable in continuous and monotonic manner, and determining the direction of the magnetic field by measuring the two mutually-orthogonal components of the resultant magnetic field varying respectively substantially as cosine and sine functions of the angle of the resultant magnetic field.

2. A method according to claim 1, characterized in that the direction of the main magnetic field varies over a range substantially of the order of 360° along the trajectory.

3. A measuring method according to claim 1, characterized in that it consists in subjecting the measuring system to the compensation magnetic field of amplitude that has a fixed value that, combined with the minimum amplitude measured by the measuring system and delivered uniquely by the main creation system, yields an amplitude value above a lower detection threshold of the measuring system.

4. A measurement magnetic sensor for contactless magnetic detection of relative movement along a trajectory between a creation system for creating a main magnetic field a measuring system sensitive to the direction of the magnetic field, the creation system creating a main magnetic field of direction that varies at least in a plane and that is detected by the measuring system in order to determine the relative position along that trajectory, characterized in that it includes a compensation creation system for creating a compensation magnetic field associated with the measuring system for subjecting said measuring system to a compensation magnetic field of direction that is fixed and opposite to the direction of the maximum main magnetic field measured by the measuring system and delivered uniquely by the main creation system such that the measuring system is sensitive to a resultant magnetic field resulting from the combination of the main magnetic field and the compensation magnetic field), the direction of the resultant magnetic field being variable in continuous and monotonic manner, the measuring system measuring the magnetic field by measuring the two mutually-orthogonal components of the resultant magnetic field respectively varying substantially as cosine and sine functions of the angle of the resultant magnetic field.

5. A measurement magnetic sensor according to claim 4, characterized in that the compensation system for creating a compensation magnetic field delivers a compensation magnetic field of amplitude that has a fixed value that, combined with the minimum amplitude measured by the measuring system and delivered by the main creation system, yields an amplitude value above a lower detection threshold of the measuring system.

6. A measurement magnetic sensor according to claim 4, characterized in that the system for creating a main magnetic field and the system for creating a compensation magnetic field are provided by magnets.

7. A measurement magnetic sensor according to claim 4, characterized in that the compensation magnetic field created by said compensation creation system has a direction normal to the trajectory.

8. A measurement magnetic sensor according to claim 7, characterized in that the compensation magnetic field created by said compensation creation system has a direction normal to the trajectory that is linear or circular.

* * * * *